United States Patent
Nanba et al.

(10) Patent No.: US 9,593,253 B2
(45) Date of Patent: Mar. 14, 2017

(54) RESIN COMPOSITION FOR GOLF BALLS

(71) Applicant: BRIDGESTONE SPORTS CO., LTD., Tokyo (JP)

(72) Inventors: Atsushi Nanba, Chichibushi (JP); Takanori Tago, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 14/926,173

(22) Filed: Oct. 29, 2015

(65) Prior Publication Data
US 2016/0177120 A1 Jun. 23, 2016

(30) Foreign Application Priority Data
Dec. 22, 2014 (JP) .................. 2014-258772

(51) Int. Cl.
| | |
|---|---|
| C08K 5/098 | (2006.01) |
| C08K 5/09 | (2006.01) |
| C08K 5/3492 | (2006.01) |
| A63B 37/12 | (2006.01) |
| C09D 123/08 | (2006.01) |
| C09D 5/22 | (2006.01) |
| A63B 37/00 | (2006.01) |

(52) U.S. Cl.
CPC .... C09D 123/0876 (2013.01); A63B 37/0023 (2013.01); A63B 37/0024 (2013.01); C08K 5/09 (2013.01); C08K 5/098 (2013.01); C08K 5/34924 (2013.01); C09D 5/22 (2013.01)

(58) Field of Classification Search
None
See application file for complete search history.

(56) References Cited

U.S. PATENT DOCUMENTS

| | | | |
|---|---|---|---|
| 4,017,668 A * | 4/1977 | Freedman .......... | C08K 5/34924 260/DIG. 43 |
| 6,106,415 A | 8/2000 | Masutani et al. | |
| 6,334,819 B2 | 1/2002 | Ichikawa et al. | |
| 6,716,117 B2 | 4/2004 | Ichikawa et al. | |
| 7,867,419 B2 | 1/2011 | Ohira et al. | |
| 8,419,571 B2 | 4/2013 | Ohira et al. | |
| 2004/0010070 A1* | 1/2004 | Sato ...................... | H01B 3/441 524/502 |
| 2009/0143170 A1* | 6/2009 | Ohira ..................... | A63B 45/00 473/385 |
| 2013/0165268 A1 | 6/2013 | Tajima et al. | |

FOREIGN PATENT DOCUMENTS

| | | | |
|---|---|---|---|
| JP | 07-161230 | * | 6/1995 |
| JP | 10-179795 A | | 7/1998 |
| JP | 11-137726 A | | 5/1999 |
| JP | 2003-339912 A | | 12/2003 |
| JP | 2009-131631 A | | 6/2009 |
| JP | 2013-132312 A | | 7/2013 |
| JP | 2014-90957 A | | 5/2014 |

* cited by examiner

Primary Examiner — David Buttner
(74) Attorney, Agent, or Firm — Sughrue Mion, PLLC

(57) ABSTRACT

A golf ball resin composition includes (A) (I) an olefin-$C_{3-8}$ α,β-unsaturated carboxylic acid copolymer or a metal neutralization product thereof and/or (II) an olefin-$C_{3-8}$ α,β-unsaturated carboxylic acid-$C_{3-8}$ α,β-unsaturated carboxylic acid ester terpolymer or a metal neutralization product thereof; (B) isocyanuric acid or a haloisocyanuric acid; and (C) a fatty acid or a fatty acid metal salt. When this resin composition is used as a cover material, the paint film adhesion between the cover material and various types of paint, including urethane-based paints, is excellent, enabling various properties of the golf ball to be improved.

15 Claims, No Drawings

RESIN COMPOSITION FOR GOLF BALLS

CROSS-REFERENCE TO RELATED APPLICATION

This non-provisional application claims priority under 35 U.S.C. §119(a) on Patent Application No. 2014-258772 filed in Japan on Dec. 22, 2014, the entire contents of which are hereby incorporated by reference.

BACKGROUND OF THE INVENTION

Field of the Invention

The present invention relates to a resin composition for golf balls. The invention relates in particular to a resin composition which is well-suited for use as a golf ball cover material.

Prior Art

Not all golf balls lately are white; a variety of colored balls have appeared on the market in response to golfers' preferences. For example, colored golf balls of various types that confer stylishness and elegance have been proposed as golf balls for women.

Various types of colored golf balls, including orange, pink, blue and yellow balls, are provided by using a transparent or semi-transparent resin material as the base polymer of the cover outermost layer, and mixing together with this base resin various types of pigments, dyes and aggregates.

However, particularly when trying to provide colored golf balls having a deep fluorescent color, in order to improve releasability from the mold during molding of the cover material, it is sometimes necessary to make adjustments that increase the content of fatty acid or fatty acid metal salt in the cover material and moreover increase the content of colorants, which worsens paint film adhesion.

Also, when the golf balls are marked by stamping the cover surface with lettering and images such as a logo or name, the frequency of stamping transfer defects increases.

In the field of golf balls, technical art relating to surface treatment for promoting adhesion between layers is disclosed in, for example, JP-A H10-179795, H11-137726, 2003-339912, 2009-131631, 2013-132312 and 2014-90957. However, even with such art, improvements in paint film adhesion remain inadequate.

It is therefore an object of this invention to provide a resin composition for golf balls which improves adhesion between the cover material and paint, minimizing the occurrence of uneven painting.

SUMMARY OF THE INVENTION

As a result of extensive investigations, we have discovered that by including isocyanuric acid in the cover material, adhesion between the resulting cover and a urethane-based paint film is improved. In particular, we have found that, in colored golf balls wherein the cover material contains a fatty acid or fatty acid metal salt and a colorant, when a suitable amount of colorant is included in the cover material, the cover material exhibits a high wetting tension value, enabling adhesion between the cover surface and paint to be improved.

Accordingly, the invention provides a resin composition for golf balls that includes (A) (I) an olefin-$C_{3-8}$ $\alpha,\beta$-unsaturated carboxylic acid copolymer or a metal neutralization product thereof and/or (II) an olefin-$C_{3-8}$ $\alpha,\beta$-unsaturated carboxylic acid-$C_{3-8}$ $\alpha,\beta$-unsaturated carboxylic acid ester terpolymer or a metal neutralization product thereof; (B) isocyanuric acid or a haloisocyanuric acid; and (C) a fatty acid or a fatty acid metal salt. Component A accounts for at least part of a base resin of the composition.

In the resin composition of the invention, it is preferable for component (C) to be included in an amount of from 0.1 to 3.0 parts by weight per 100 parts by weight of the base resin.

In the resin composition of the invention, it is preferable for component (B) to be isocyanuric acid and for the isocyanuric acid to be included in an amount of from 0.2 to 10 parts by weight per 100 parts by weight of the base resin.

The resin composition of the invention preferably has a wetting tension measured in accordance with JIS K6768 of at least 69 mN/m.

It is preferable for the resin composition of the invention to further include a colorant that is a fluorescent dye in an amount of from 0.03 to 0.2 part by weight per 100 parts by weight of the base resin.

The resin composition of the invention is preferably used as a golf ball cover material.

The golf ball resin composition of the invention has a high wetting tension and provides excellent adhesion between the cover material and paint. In particular, adhesion with a urethane-based paint can be dramatically enhanced. Mold releasability when using this resin composition in golf ball production is also good.

DETAILED DESCRIPTION OF THE INVENTION

The objects, features and advantages of the invention will become more apparent from the following detailed description.

The golf ball resin composition of the invention includes essential components A to C below:

(A) (I) an olefin-$C_{3-8}$ $\alpha,\beta$-unsaturated carboxylic acid copolymer or a metal neutralization product thereof and/or (II) an olefin-$C_{3-8}$ $\alpha,\beta$-unsaturated carboxylic acid-$C_{3-8}$ $\alpha,\beta$-unsaturated carboxylic acid ester terpolymer or a metal neutralization product thereof;

(B) isocyanuric acid or a haloisocyanuric acid; and (C) a fatty acid or a fatty acid metal salt.

Component A is the chief ingredient of the base resin in the golf ball resin composition of the invention. It is recommended that component A be included such that the content thereof in the base resin, although not particularly limited, is at least 60 wt %, preferably at least 70 wt %, more preferably at least 80 wt %, and most preferably at least 90 wt %, with the upper limit being 100 wt % or less, preferably 98 wt % or less, and more preferably 95 wt % or less. When the amount included is inadequate, it may be difficult to achieve a sufficient rebound and durability.

In cases where component A is an olefin-unsaturated carboxylic acid copolymer, the number of carbons on the olefin is preferably at least 2, with the upper limit being preferably 8 or less, and more preferably 6 or less. Illustrative examples of such olefins include ethylene, propylene, butylene, pentene, hexene, heptene and octene. The use of ethylene is especially preferred. Illustrative examples of unsaturated carboxylic acids of 3 to 8 carbons include acrylic acid, methacrylic acid, 3,3-dimethylacrylic acid, ethacrylic acid, maleic acid and maleic anhydride, and fumaric acid. The use of acrylic acid or methacrylic acid is especially preferred.

In cases where component A is an olefin-unsaturated carboxylic acid-unsaturated carboxylic acid ester terpolymer, the olefin and the unsaturated carboxylic acid are exemplified in the same way as for the olefin-unsaturated carboxylic acid copolymer. The unsaturated carboxylic acid ester is preferably a lower alkyl ester of any of the above unsaturated carboxylic acids. For example, use may be made of methyl methacrylate, ethyl methacrylate, propyl methacrylate, butyl methacrylate, methyl acrylate, ethyl acrylate, propyl acrylate or butyl acrylate. The use of butyl acrylate (n-butyl acrylate, isobutyl acrylate) is especially preferred.

In component A, (I) an olefin-unsaturated carboxylic acid copolymer (binary copolymer) or a metal salt thereof and (II) an olefin-unsaturated carboxylic acid-unsaturated carboxylic acid ester copolymer (terpolymer) or a metal salt thereof may be used together. When a binary copolymer or a metal salt thereof (I) and a terpolymer or a metal salt thereof (II) are used together, they are preferably blended in a weight ratio (I):(II) of between 0:100 and 80:20. Including more (I) than the above range may result in an inferior ball durability.

In cases where the metal neutralization product of a resin (that is, an ionomer) is used as component A, the type of metal neutralization product and the degree of neutralization are not particularly limited. Illustrative examples include 60 mol % Zn (degree of neutralization with zinc) ethylene-methacrylic acid copolymers, 40 mol % Mg (degree of neutralization with magnesium) ethylene-methacrylic acid copolymers, and 40 mol % Mg (degree of neutralization with magnesium) ethylene-methacrylic acid-isobutylene acrylate terpolymers.

For example, commercial products such as various products under the brand designations "Himilan" and "Nucrel" (both produced by DuPont-Mitsui Polychemicals Co., Ltd.) and various products under the brand designation "Escor" (produced by ExxonMobil Chemical) may be used as component A.

The isocyanuric acid or haloisocyanuric acid of component B is a compound of formula (I) below.

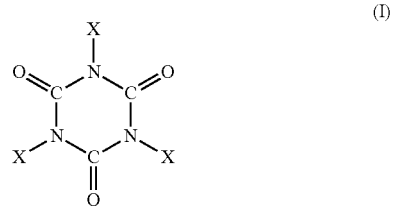

(I)

In the formula, X is a hydrogen atom, a halogen atom or an alkali metal atom. In haloisocyanuric acids, at least one occurrence of X is a halogen atom. Preferred halogen atoms include fluorine, chlorine and bromine, with chlorine being especially preferred. Preferred alkali metal atoms include lithium, sodium and potassium.

In this invention, "haloisocyanuric acid" encompasses also metal salts thereof. Illustrative examples include chloroisocyanuric acid, sodium chloroisocyanurate, potassium chloroisocyanurate, dichloroisocyanuric acid, sodium dichloroisocyanurate, sodium dichloroisocyanurate dihydrate, potassium dichloroisocyanurate, trichloroisocyanuric acid, tribromoisocyanuric acid, dibromoisocyanuric acid, bromoisocyanuric acid, sodium and other salts of dibromisocyanuric acid, as well as hydrates thereof, and difluoroisocyanuric acid. Of these, chloroisocyanuric acid, sodium chloroisocyanurate, potassium chloroisocyanurate, dichloroisocyanuric acid, sodium dichloroisocyanurate, potassium dichloroisocyanurate and trichloroisocyanuric acid are preferred.

The amount of component B, although not particularly limited, is preferably from 0.2 to 10 parts by weight, and more preferably from 0.5 to 5 parts by weight, per 100 parts by weight of the base resin. Outside of this range, sufficient paint film adhesion may not be obtained, or effects in keeping with this content may not be obtained.

A fatty acid or fatty acid metal salt is included as component C in the golf ball composition for the purpose of increasing mold releasability. The fatty acid or fatty acid metal salt used as component C is preferably one, two or more selected from the group consisting of stearic acid, behenic acid, oleic acid, maleic acid, and metal salts thereof. Alternatively, the organic acid metal salt of component C may be a metal soap, with the metal salt being one in which a metal ion having a valence of 1 to 3 is used. The metal is preferably one selected from the group consisting of lithium, sodium, magnesium, aluminum, potassium, calcium and zinc, with the use of metal salts of stearic acid being especially preferred. Specifically, the use of magnesium stearate, calcium stearate, zinc stearate or sodium stearate is preferred, with the use of magnesium stearate being especially preferred.

The amount of component C included per 100 parts by weight of the base resin is preferably from 0.1 to 3.0 parts by weight, and more preferably from 0.1 to 2.5 parts by weight. At too low a component C content, releasability from the mold may worsen. On the other hand, at too high a component C content, paint film adhesion may worsen.

The golf ball resin composition of the invention may include any of various types of thermoplastic resins, provided that doing so does not detract from the objects of the invention. Such thermoplastic resins are exemplified by, but not limited to, one or more selected from among polyolefin elastomers (including polyolefins and metallocene-catalyzed polyolefins), polystyrene elastomers, polyacrylate polymers, polyamide elastomers, polyurethane elastomers, polyester elastomers and polyacetals. Illustrative examples include polyethylene methacrylate, maleic anhydride-grafted polyethylene ethyl acrylate, hexamethylene diisocyanate (HDI)-poly-ε-caprolactone (PCL), 4,4'-dicyclohexylmethane diisocyanate (H12-MDI)-polytetra-methylene glycol (PTMG), polystyrene-butylene, polybutylene terephthalate, polyether polyamide and polyoxymethylene. The weight ratio thereof, expressed as component A/thermoplastic resin, is preferably from 50/50 to 99/1, more preferably from 60/40 to 95/5, and even more preferably from 70/30 to 90/10.

Optional additives may be suitably included in the golf ball resin composition of the invention according to the intended use of the resin composition. For example, in cases where the inventive golf ball composition is to be used as a cover material, additives such as fillers (inorganic fillers), short organic fibers, reinforcements, crosslinking agents, pigments, dispersants, antioxidants, ultraviolet absorbers and light stabilizers may be added to the above ingredients. When these additives are included, the content thereof, per 100 parts by weight of the base resin, is preferably at least 0.1 part by weight, and more preferably at least 0.5 part by weight, with the upper limit being preferably 10 parts by weight or less, and more preferably 4 parts by weight or less.

The golf ball resin composition may be advantageously used as a colored golf ball material. In such a case, the type of colorant included in the cover material is not particularly limited, although preferred use can be made of, for example, inorganic pigments, organic pigments, fluorescent pigments, natural dyes, synthetic dyes and fluorescent dyes.

In cases where a fluorescent pigment or fluorescent dye is used as the colorant, the pigment or dye that emits fluorescence is attached to a thermoplastic or thermoset resin, and masses thereof are ground up into a fine powder. The organic resin to which the dye or pigment is attached, although not particularly limited, is preferably an amino resin, a polyester resin or an acrylic resin. Organic fluorescent pigments receive visible light or ultraviolet light energy and emit visible light fluorescence, but differ from inorganic phosphors in that they have a large fluorescence intensity and, due to synergistic effects between the reflected color of the pigment itself and the fluorescence, exhibit a strong coloration. For these reasons, they are well-suited for use in outdoor sports products such as golf balls that are used under the sun.

The colorant content, although not particularly limited, may be set to preferably from 0.03 to 0.2 part by weight per 100 parts by weight of the base resin. When this colorant content is too high, particularly in the case of dyes, other objects may be inadvertently colored upon coming into contact with the colored golf ball.

The golf ball resin composition of the invention can be obtained by using any of various types of mixers, such as a kneading type twin-screw extruder, a Banbury mixer, a kneader or a Labo Plastomill, to mix together the above components, either all at once or in stages. The production extruder may be either a single-screw extruder or a twin-screw extruder, with a twin-screw extruder being more preferred. These extruders may be used in a tandem arrangement, such as single-screw extruder/twin-screw extruder or twin-screw extruder/twin-screw extruder.

The golf ball resin composition of the invention may be used as the material for making a one-piece golf ball, or may be used as the cover material in a two-piece solid golf ball composed of a core and a cover encasing the core or in a multi-piece solid golf ball composed of a core of one or more layer and a multilayer cover encasing the core.

The golf ball resin composition of the invention preferably has a wetting tension, as measured in accordance with JIS K6768, of at least 69 mN/m, and especially at least 70 mN/m. This wetting tension can serve as an indicator of the printability and adhesive properties of the resin composition in this invention. That is, when the resin composition has a wetting tension of 69 mN/m or more, this has the advantage that the paint film adhesion which is a specific effect of the invention increases, so that uneven painting and poor ink transfer are unlikely to occur.

The wettability test of JIS K6768 is described below.

Using a cotton swab, a liquid reagent is rapidly spread on a test specimen over a surface area of at least 6 cm. The amount of liquid is set to a degree such as to form a thin film without puddling. The wetting tension is determined by observing the liquid film of the reagent in a well-lighted place, and evaluating the condition of the film after 2 seconds. The surface is regarded as wet when the liquid film remains in the same state as when applied for 2 seconds or more without breakage of the film. In cases where wetness is maintained for 2 seconds or more, testing continues with the reagent having the next higher surface tension. On the other hand, when the liquid film breaks in less than 2 seconds, testing continues with the reagent having the next lower surface tension. This operation is repeated and a reagent capable of wetting the surface area of the test specimen for exactly 2 seconds is selected. The numerical value of the surface tension (dyne/cm) of the selected reagent is treated as the wettability (index) of the test specimen.

The cover is a member which encases the core. It has at least one layer, and may be, for example, a two-layer cover or a three-layer cover. In the case of a two-layer cover, sometimes the inner layer is called the intermediate layer and the outer layer is called the outermost layer. In the case of a three-layer cover, the respective layers are sometimes called, in order from the inside: the envelope layer, the intermediate layer and the outermost layer.

When the resin composition of the invention is employed as the outermost layer, the other cover layers, although not particularly limited, may be formed of an ionomer resin or a highly neutralized resin material. For example, the envelope layer may be formed of a highly neutralized resin material, and the intermediate layer may be formed of an ionomer resin.

In cases where the resin composition of the invention is used as the material making up the layer that inwardly adjoins the outermost layer on the inside, the other cover layers may be formed of an ionomer resin, a highly neutralized resin material, and additionally a polyurethane resin. For example, the envelope layer may be formed of a highly neutralized resin material or an ionomer resin, and the outermost layer may be formed of an ionomer resin or a polyurethane resin.

The core may be formed using a known rubber material as the base material. A known base rubber such as a natural rubber or a synthetic rubber may be used as the base rubber. Specifically, it is recommended that a polybutadiene, particularly cis-1,4-polybutadiene having a cis structure content of at least 40%, be primarily used. Where desired, a natural rubber, polyisoprene rubber, styrene-butadiene rubber or the like may be used together with the above polybutadiene in the base rubber.

The polybutadiene may be one synthesized using such metal catalysts as neodymium and other rare-earth element catalysts, cobalt catalysts and nickel catalysts.

Co-crosslinking agents such as unsaturated carboxylic acid and metal salts thereof; inorganic fillers such as zinc oxide, barium sulfate and calcium carbonate; and organic peroxides such as dicumyl peroxide and 1,1-bis(t-butylperoxy)cyclohexane may be included in the base rubber. Where necessary, commercially available antioxidants and other additives may be suitably added.

Numerous dimples of one, two or more types may be formed on the surface of the cover (outermost layer). In addition, various paints may be applied to the cover surface. Owing to the need for the paint to be able to withstand the harsh conditions of golf ball use, a two-part curing urethane paint, and especially a non-yellowing urethane paint, is preferred for this purpose.

EXAMPLES

The following Examples and Comparative Examples are provided to illustrate the invention, and are not intended to limit the scope thereof.

Examples 1 to 5, Comparative Examples 1 to 4

Preparation of Golf Ball Resin Composition

Resin compositions for the outermost layer were prepared as shown in Table 1 below. The resin compositions in the respective working examples and comparative examples were rendered into test specimens, and the wetting tensions of the test specimens were measured in accordance with JIS K6768. The results are presented in Table 1.

TABLE 1

| Outermost layer material | | Example | | | | | Comparative Example | | | |
|---|---|---|---|---|---|---|---|---|---|---|
| | | 1 | 2 | 3 | 4 | 5 | 1 | 2 | 3 | 4 |
| Resin composition (pbw) | Surlyn 8940 | 50 | 50 | 50 | 50 | 50 | 50 | 50 | 50 | 50 |
| | Surlyn 9945 | 15 | 15 | 15 | 15 | 15 | 15 | 15 | 15 | 15 |
| | Surlyn 9320 | 35 | 35 | 35 | 35 | 35 | 35 | 35 | 35 | 35 |
| | Isocyanuric acid | 1 | 2 | 4 | 2 | 1 | | | | 1 |
| | Magnesium stearate | 0.1 | 0.1 | 0.1 | 2.17 | 0.9 | 0.1 | 1 | 2.17 | |
| | Titanium oxide | 0.04 | 0.04 | 0.04 | 3.69 | 3.69 | 0.04 | 0.03 | 3.69 | 3.69 |
| | Solvent Green 5 | 0.15 | 0.15 | 0.15 | | | 0.15 | 0.1 | | |
| Wetting tension, JIS K6768 (mN/m) | | 71.5 | 71.5 | 71.5 | 70.8 | 71.5 | 67.8 | 67.8 | 67.0 | 71.5 |

Details on the materials in the outermost layer are given below. The numbers in the table stand for parts by weight.

Surlyn 8940, 9945, 9320: Ionomer resins available from E.I. DuPont de Nemours & Co.
Isocyanuric acid: Available from Nissan Chemical Industries, Ltd.
Magnesium stearate: Available from NOF Corporation
Titanium oxide: Available from Ishihara Sangyo Kaisha, Ltd.
Solvent Green 5: A fluorescent dye available as "Sumiplast FL7G" from Sumika Chemtex Co., Ltd.

Wetting Tension Test Method for Above Compositions

Measurement was carried out in accordance with JIS K6768. The procedure was as follows.

A tension checker liquid available from Kasuga Electric Works, Ltd. was used as the reagent. A 1 mm thick sheet was created for each composition, and reagent (tension checker liquid) was spread over the surface of the sheet with a cotton swab. A reagent capable of wetting the surface of the test specimen in exactly 2 seconds was selected, and the numerical value of the surface tension for the selected reagent was treated as the wettability (index) of the test specimen. The results are presented in Table 1.

Cores were fabricated by preparing a core rubber composition according to the formulation shown in Table 2, then molding and vulcanizing the composition at 155° C. for 15 minutes. Next, an intermediate layer material formulated from the resin materials shown in the same table was injection-molded over the core, thereby encasing the core with an intermediate layer. Finally, an outermost layer formulated from the resin materials shown in Table 1 above was formed over the intermediate layer, thereby producing a three-piece solid golf ball. The core and intermediate layer materials, which were the same for all of the examples, are shown in Table 2 below.

Next, a urethane paint was applied. Specifically, a urethane paint containing a fluorescent brightener available from Asia Industry Co., Ltd. was spray-coated onto the ball surface.

TABLE 2

| Members | Ingredients | Amount |
|---|---|---|
| Intermediate layer | HPF 2000 | 100 |
| Core | cis-1,4-Polybutadiene | 100 |
| | Barium sulfate | 31.04 |
| | Zinc oxide | 4 |
| | Zinc stearate | 5 |
| | Antioxidant | 0.1 |

TABLE 2-continued

| Members | Ingredients | Amount |
|---|---|---|
| | Zinc salt of pentachlorothiophenol | 0.1 |
| | Zinc acrylate | 21.5 |
| | Organic peroxide (1) | 0.6 |
| | Organic peroxide (2) | 0.6 |

Details on the core material are given below. Numbers in the table indicate parts by weight.

cis-1,4-Polybutadiene: Available under the trade name "BR 01" from JSR Corporation
Barium sulfate: Available under the trade name "Barico #100" from Hakusui Tech Co., Ltd.
Zinc stearate: Available from NOF Corporation
Antioxidant: 2,2'-Methylenebis(4-methyl-6-t-butylphenol), available under the trade name "Nocrac NS-6" from Ouchi Shino Chemical Industry Co., Ltd.
Zinc salt of pentachlorothiophenol:
Zinc acrylate: Available from Nippon Jyoryu Kogyo Co., Ltd.
Organic peroxide (1): Dicumyl peroxide, available under the trade name "Percumyl D" from NOF Corporation
Organic peroxide (2): A mixture of 1,1-di(t-butylperoxy) cyclohexane and silica, available under the trade name "Perhexa C-40" from NOF Corporation Details on the intermediate layer material are given below. Numbers in the table indicate parts by weight.

HPF 2000: HPF™ 2000, available from E.I. DuPont de Nemours & Co.

The paint film adhesion and mold releasability for each of the golf balls obtained in the Working Examples and Comparative Examples were evaluated as described below. The results are shown in Table 3.

Diameters of Core and Intermediate Layer-Encased Sphere

The diameters at five random places on the surface of a core or an intermediate layer-encased sphere were measured at a temperature of 23.9±1° C. and, using the average of these measurements as the measured value for a single core or intermediate layer-encased sphere, the average diameter for five measured cores or intermediate layer-encased spheres was determined.

Ball Diameter

The diameters at 15 random dimple-free places (lands) on the surface of a ball were measured at a temperature of 23.9±1° C. and, using the average of these measurements as the measured value for a single ball, the average diameter for five measured balls was determined.

Paint Film Adhesion

A golf ball onto which the fluorescent brightener-containing urethane paint had been coated and dried was placed under an ultraviolet light to induce color development. In cases where the paint film thickness is uneven, this can easily be visually determined from light-dark contrasts in color development. In these Examples, the paint film adhesion was evaluated as follows based on the incidence of uneven painting.

Good: Uneven painting occurred in less than 20 balls out of 1,000

NG: Uneven painting occurred in 20 or more balls out of 1,000

Mold Releasability

After the cover material was injection-molded, the mold interior was cooled to 15 to 25° C. and the ball was cooled therein for 30 seconds. The condition of ball removal was evaluated according to the following criteria.

Good: Ejection pin marks did not form when ball was removed.

NG: Ejection pin marks formed on ball.

TABLE 3

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
| Core | Diameter (mm) | 36.6 | 36.6 | 36.6 | 36.6 | 36.6 | 36.6 | 36.6 | 36.6 | 36.6 |
|  | Weight (g) | 31.2 | 31.2 | 31.2 | 31.2 | 31.2 | 31.2 | 31.2 | 31.2 | 31.2 |
| Intermediate layer-encased sphere | Diameter (mm) | 39.7 | 39.7 | 39.7 | 39.7 | 39.7 | 39.7 | 39.7 | 39.7 | 39.7 |
|  | Weight (g) | 38 | 38 | 38 | 38 | 38 | 38 | 38 | 38 | 38 |
| Outermost layer-encased sphere (ball) | Diameter (mm) | 42.7 | 42.7 | 42.7 | 42.7 | 42.7 | 42.7 | 42.7 | 42.7 | 42.7 |
|  | Weight (g) | 45.2 | 45.2 | 45.2 | 45.3 | 45.3 | 45.2 | 45.2 | 45.3 | 45.3 |
| Evaluations | Paint adhesion state | good | good | good | good | good | NG | NG | NG | good |
|  | Mold releasability | good | good | good | good | good | good | good | good | NG |

As is apparent from the results in Table 3, the Comparative Examples were inferior to the Working Examples in the following respects.

In Comparative Example 1, a composition containing no isocyanuric acid was used. As a result, the paint adhesion state was poor compared to Example 1.

In Comparative Example 2, a composition containing no isocyanuric acid was used. Accordingly, as in Comparative Example 1, the paint adhesion state was poor.

In Comparative Example 3, a composition containing no isocyanuric acid was used. As a result, the paint adhesion state was poor compared to Example 4.

In Comparative Example 4, a composition which contained isocyanuric acid but did not contain magnesium stearate was used. As a result, the mold releasability during injection molding was poor compared with Example 5.

Japanese Patent Application No. 2014-258772 is Incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A resin composition for golf balls comprising:
   (A) a resin component consisting of (I) an olefin-$C_{3-8}$ α,β-unsaturated carboxylic acid copolymer or a metal neutralization product thereof, (II) an olefin-$C_{3-8}$ α,β-unsaturated carboxylic acid-$C_{3-8}$ α,β-unsaturated carboxylic acid ester terpolymer or a metal neutralization product thereof, or both (I) and (II);
   (B) isocyanuric acid or a haloisocyanuric acid; and
   (C) a fatty acid or a fatty acid metal salt.

2. The resin composition of claim 1, wherein component (C) is included in an amount of from 0.1 to 3.0 parts by weight per 100 parts by weight of the resin component.

3. The resin composition of claim 1, wherein component (B) is isocyanuric acid and is included in an amount of from 0.2 to 10 parts by weight per 100 parts by weight of the resin component.

4. The resin composition of claim 1 which has a wetting tension measured in accordance with JIS K 6768 of at least 69 mN/m.

5. The resin composition of claim 1, further comprising a colorant which is a fluorescent dye and is included in an amount of from 0.03 to 0.2 part by weight per 100 parts by weight of the resin component.

6. A golf ball cover comprising the resin composition of claim 1.

7. The resin composition of claim 1, wherein the resin component is a blend of (I) and (II) in a weight ratio (I):(II) of between 0:100 and 80:20.

8. The resin composition of claim 1, wherein the resin component comprises a metal neutralization product of (I) or a metal neutralization product (II) or metal neutralization products of both (I) and (II).

9. A resin composition for golf balls comprising:
   (A) (I) an olefin-$C_{3-8}$ α,β-unsaturated carboxylic acid copolymer or a metal neutralization product thereof, (II) an olefin-$C_{3-8}$ α,β-unsaturated carboxylic acid-$C_{3-8}$ α,β-unsaturated carboxylic acid ester terpolymer or a metal neutralization product thereof, or both (I) and (II);
   (B) isocyanuric acid or a haloisocyanuric acid;
   (C) a fatty acid or a fatty acid metal salt, and
   a colorant which is a fluorescent dye and is included in an amount of from 0.03 to 0.2 part by weight per 100 parts by weight of a base resin,
wherein component A comprises at least part of a base resin of the composition.

10. The resin composition of claim 9, wherein component (C) is included in an amount of from 0.1 to 3.0 parts by weight per 100 parts by weight of the base resin.

11. The resin composition of claim 9, wherein component (B) is isocyanuric acid and is included in an amount of from 0.2 to 10 parts by weight per 100 parts by weight of the base resin.

12. The resin composition of claim 9 which has a wetting tension measured in accordance with JIS K 6768 of at least 69 mN/m.

13. A golf ball cover comprising the resin composition of claim 9.

14. The resin composition of claim 9, wherein the resin component is a blend of (I) and (II) in a weight ratio (I):(II) of between 0:100 and 80:20.

15. The resin composition of claim 9, wherein the resin component comprises a metal neutralization product of (I) or a metal neutralization product (II) or metal neutralization products of both (I) and (II).

* * * * *